(12) United States Patent
Ono

(10) Patent No.: US 12,489,997 B2
(45) Date of Patent: Dec. 2, 2025

(54) IMAGE PICKUP APPARATUS

(71) Applicant: SONY SEMICONDUCTOR SOLUTIONS CORPORATION, Kanagawa (JP)

(72) Inventor: Toshiaki Ono, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 186 days.

(21) Appl. No.: 18/251,451

(22) PCT Filed: Oct. 29, 2021

(86) PCT No.: PCT/JP2021/039954
§ 371 (c)(1),
(2) Date: May 2, 2023

(87) PCT Pub. No.: WO2022/102433
PCT Pub. Date: May 19, 2022

(65) Prior Publication Data
US 2023/0412945 A1 Dec. 21, 2023

(30) Foreign Application Priority Data
Nov. 12, 2020 (JP) .................................. 2020-188405

(51) Int. Cl.
*H04N 25/771* (2023.01)
*H04N 25/532* (2023.01)
*H04N 25/78* (2023.01)

(52) U.S. Cl.
CPC ......... *H04N 25/771* (2023.01); *H04N 25/532* (2023.01); *H04N 25/78* (2023.01)

(58) Field of Classification Search
CPC .... H04N 25/771; H04N 25/532; H04N 25/78; H04N 25/59; H04N 25/616
See application file for complete search history.

(56) References Cited

U.S. PATENT DOCUMENTS

2014/0253774 A1* 9/2014 Ogura .................... H04N 25/78
348/308
2016/0088251 A1* 3/2016 Luo ....................... H04N 25/771
250/208.1

(Continued)

FOREIGN PATENT DOCUMENTS

CN  111416953 A  7/2020
JP  2013-009294 A  1/2013

(Continued)

OTHER PUBLICATIONS

International Search Report and Written Opinion of PCT Application No. PCT/JP2021/039954, issued on Jan. 18, 2022, 10 pages of ISRWO.

*Primary Examiner* — Twyler L Haskins
*Assistant Examiner* — John H Morehead, III
(74) *Attorney, Agent, or Firm* — CHIP LAW GROUP

(57) ABSTRACT

A image pickup apparatus that includes a photoelectric conversion unit that performs photoelectric conversion, a first capacitor and a second capacitor that hold a signal from the photoelectric conversion unit, and an initialization switch that initializes the second capacitor, in which one end of the first capacitor, one end of the second capacitor, and an amplification unit that amplifies a signal from the photoelectric conversion unit are connected, another end of the second capacitor and one end of the initialization switch are connected, and another end of the first capacitor and another end of the initialization switch are connected to a voltage source.

6 Claims, 14 Drawing Sheets

(56) References Cited

U.S. PATENT DOCUMENTS

| | | | |
|---|---|---|---|
| 2016/0295142 A1* | 10/2016 | Yoshida | H04N 25/76 |
| 2016/0358958 A1* | 12/2016 | Miyoshi | H04N 25/77 |
| 2017/0104946 A1 | 4/2017 | Hong | |
| 2018/0332247 A1* | 11/2018 | Do | H04N 25/78 |
| 2019/0115931 A1* | 4/2019 | Hurwitz | H04N 25/78 |
| 2020/0228740 A1* | 7/2020 | Otaka | H04N 25/772 |
| 2020/0251512 A1 | 8/2020 | Im | |
| 2020/0312896 A1 | 10/2020 | Simony | |
| 2020/0357754 A1* | 11/2020 | Toyoshima | H10F 39/182 |
| 2020/0389617 A1* | 12/2020 | Totsuka | H04N 25/778 |
| 2020/0412994 A1* | 12/2020 | Etou | H04N 25/618 |

FOREIGN PATENT DOCUMENTS

| | | |
|---|---|---|
| JP | 2017-108066 A | 6/2017 |
| JP | 2018-113606 A | 7/2018 |
| KR | 20170047273 A | 5/2017 |
| WO | 2020/075009 A1 | 4/2020 |

* cited by examiner

IMAGE PICKUP APPARATUS

CROSS REFERENCE TO RELATED APPLICATIONS

This application is a U.S. National Phase of International Patent Application No. PCT/JP2021/039954 filed on Oct. 29, 2021, which claims priority benefit of Japanese Patent Application No. JP 2020-188405 filed in the Japan Patent Office on Nov. 12, 2020. Each of the above-referenced applications is hereby incorporated herein by reference in its entirety.

TECHNICAL FIELD

The present technology relates to an image pickup apparatus, and for example, to an image pickup apparatus capable of further improving image quality.

BACKGROUND ART

There are known a camera-equipped mobile phone using an image pickup element such as a charge coupled device (CCD) or a complementary metal oxide semiconductor (CMOS) image sensor, a digital still camera, a medical device such as an endoscope, and the like.

Patent Document 1 proposes that, in a global shutter operation, voltage is held in a capacitor in a pixel, and the voltage is continuously held during a read operation for each row.

CITATION LIST

Patent Document

Patent Document 1: Japanese Patent Application Laid-Open No. 2013-9294

SUMMARY OF THE INVENTION

Problems to be Solved by the Invention

After the global shutter operation, reading is sequentially performed for each row. Although a row to be read first has a short signal holding period, a row to be read last continues holding a signal while other rows are being read. If there is leakage current in a capacitive element, a switch, or the like in a pixel, there is a possibility that a signal held in the capacitor changes before being read, and thus there is a possibility that image quality is deteriorated.

It is desired to reduce an effect of leakage current to improve image quality.

The present technology has been developed in view of the above circumstances, and to reduce an effect of leakage current to improve image quality.

Solutions to Problems

An image pickup apparatus according to one aspect of the present technology includes a photoelectric conversion unit that performs photoelectric conversion, a first capacitor and a second capacitor that hold a signal from the photoelectric conversion unit, and an initialization switch that initializes the second capacitor, in which one end of the first capacitor, one end of the second capacitor, and an amplification unit that amplifies a signal from the photoelectric conversion unit are connected, another end of the second capacitor and one end of the initialization switch are connected, and another end of the first capacitor and another end of the initialization switch are connected to a voltage source.

An image pickup apparatus according to one aspect of the present technology includes a first capacitor and a second capacitor that hold a signal from a photoelectric conversion unit that performs photoelectric conversion, and an initialization switch that initializes the second capacitor. One end of the first capacitor, one end of the second capacitor, and an amplification unit that amplifies a signal from the photoelectric conversion unit are connected, another end of the second capacitor and one end of the initialization switch are connected, and another end of the first capacitor and another end of the initialization switch are connected to a voltage source.

Note that the image pickup apparatus may be an independent apparatus or may be an inner block including one apparatus.

MODES FOR CARRYING OUT THE INVENTION

Modes for carrying out the present technology (hereinafter, referred to as embodiments) will be described below.

<Configuration of Electronic Device>

The present technology can be applied to, for example, an electronic device such as a digital camera. Here, a case where the present technology is applied to a digital camera will be described as an example.

Figure 1:
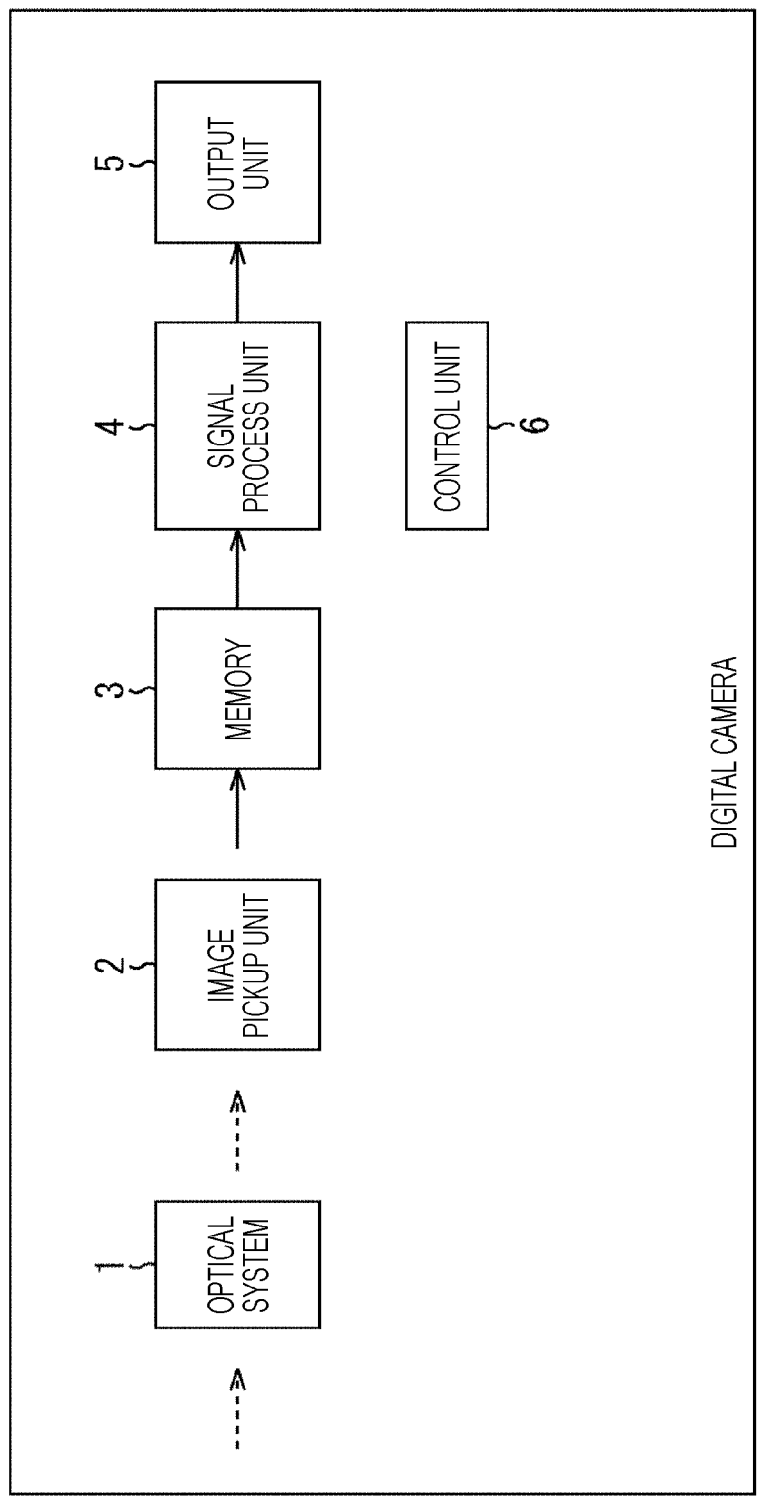
FIG. 1 is a diagram depicting a configuration example of a digital camera.

FIG. 1 is a block diagram depicting a configuration example of an embodiment of a digital camera to which the present technology is applied. Note that the digital camera can pick both a still image and a moving image.

In FIG. 1, the digital camera includes an optical system 1, an image pickup unit 2, a memory 3, a signal process unit 4, an output unit 5, and a control unit 6.

The optical system 1 includes, for example, a zoom lens, a focus lens, a diaphragm, and the like that are not depicted, and causes light from outside to enter the image pickup unit 2. The image pickup unit 2 is, for example, a complementary metal oxide semiconductor (CMOS) image sensor, and functions as an image pickup apparatus that receives light incident from the optical system 1, performs photoelectric conversion, and outputs image data corresponding to the light incident from the optical system 1.

The memory 3 temporarily stores image data output from the image pickup unit 2. The signal process unit 4 performs a process, for example, such as noise removal or white balance adjustment, as a signal process using the image data stored in the memory 3, and supplies the processed image data to the output unit 5. The output unit 5 outputs the image data from the signal process unit 4.

The output unit 5 includes, for example, a display (not depicted) including liquid crystal or the like, and displays an image corresponding to the image data from the signal process unit 4 as a so-called through image. The output unit 5 includes, for example, a driver (not depicted) that drives a recording medium such as a semiconductor memory, a magnetic disk, or an optical disk, and records the image data from the signal process unit 4 on the recording medium.

The control unit 6 controls each block that constitute the digital camera according to, for example, operation by a user.

In the digital camera configured as described above, the image pickup unit 2 receives light incident from the optical system 1 and outputs image data in response to the incident light.

The image data output from the image pickup unit 2 is supplied to and stored in the memory 3. The image data stored in the memory 3 is subjected to the signal process by the signal process unit 4, and image data obtained as a result is supplied to the output unit 5 to be output.

<Configuration Example of Image Pickup Unit>

Figure 2:
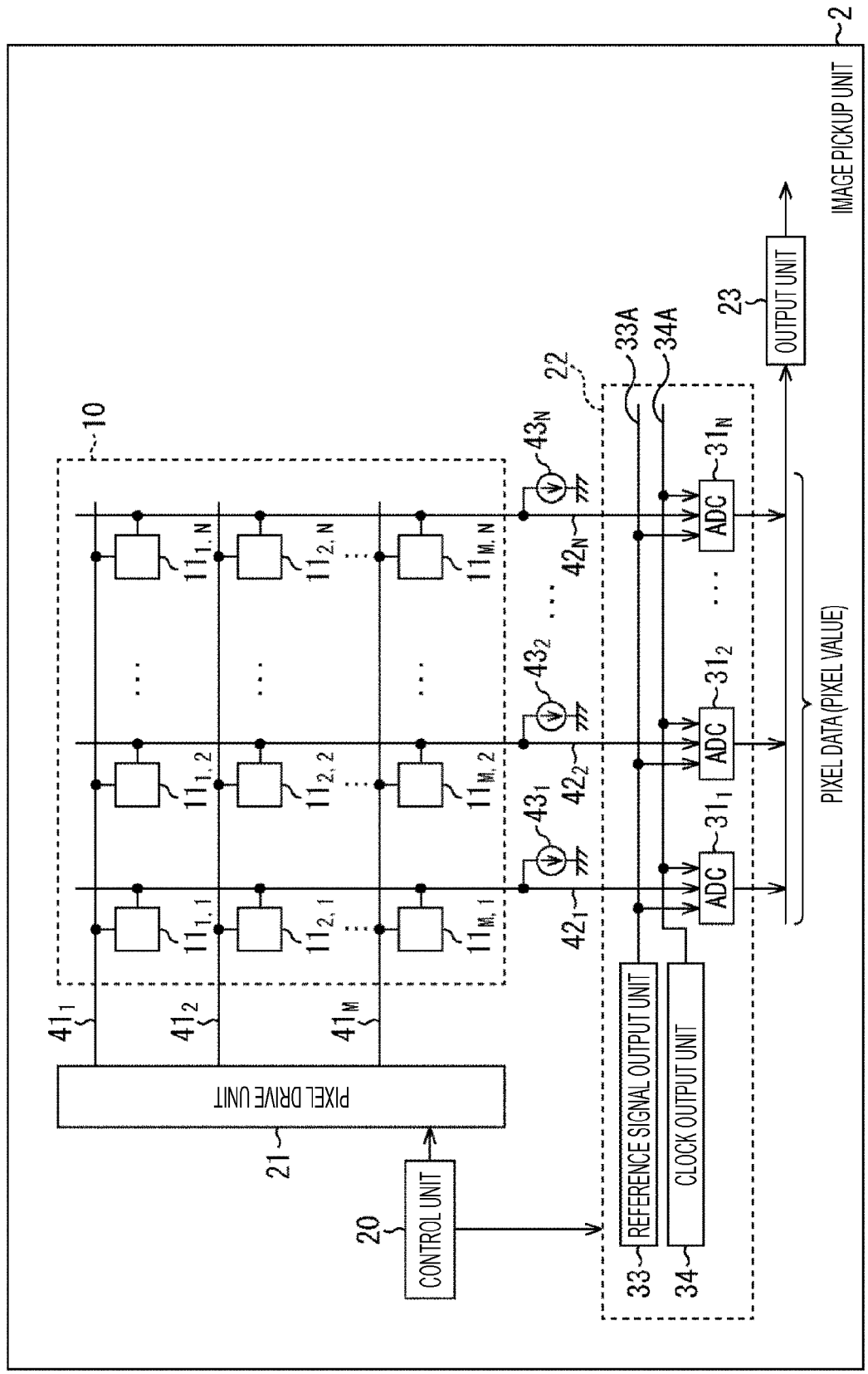
FIG. 2 is a diagram depicting a configuration example of an image pickup unit.

FIG. 2 is a block diagram depicting a configuration example of the image pickup unit 2 in FIG. 1. In FIG. 2, the image pickup unit 2 includes a pixel array 10, a control unit 20, a pixel drive unit 21, a column-parallel AD conversion apparatus 22, and an output unit 23.

The pixel array 10 includes an M×N (M and N are integers of 1 or more) number of pixels $11_{1,1}$, $11_{1,2}$, ..., $11_{1,M}$, $11_{2,1}$, $11_{2,2}$, ..., $11_{2,N}$, ..., $11_{M,1}$, $11_{M,2}$, ..., $11_{M,N}$ that perform photoelectric conversion, and functions as an image pickup unit (image pickup element) that picks up an image. The M×N number of pixels $11_{1,1}$ to $11_{M,N}$ are disposed in a matrix (lattice) of M rows and N columns on a two-dimensional plane.

A pixel control line 41m extending in a row direction (lateral direction) is connected to an N number of pixels $11_{m,1}$ to $11_{m,n}$ arranged in the row direction of an m-th row (m=1, 2, ..., M) (from top) of the pixel array 10.

Furthermore, the M number of pixels $11_{1,n}$ to $11_{M,n}$ arranged in a column direction (vertical direction) of an n-th column (n=1, 2, ..., N) (from left) are connected to a vertical signal line (VSL) 42n extending in the column direction. In addition to the pixels $11_{1,n}$ to $11_{M,n}$, a current source 43n is connected to the VSL 42n.

The pixel 11m, n performs photoelectric conversion of light incident thereon (incident light). Moreover, the pixel 11m, n outputs a voltage (electric signal) corresponding to a charge, which is obtained by photoelectric conversion, onto the VSL 42n under control of the pixel drive unit 21 via the pixel control line 41m.

Note that the pixel 11m, n can perform photoelectric conversion of light of a predetermined color, the light being incident via, for example, a color filter (not depicted) such as a Bayer array, for example.

The control unit 20 controls the pixel drive unit 21, (a reference signal output unit 33, a clock output unit 34, and the like that constitute) the column-parallel AD conversion apparatus 22, and another necessary block according to predetermined logic or the like.

Under control of the control unit 20, the pixel drive unit 21 controls (drives), via the pixel control line 41m, the pixels 11m, 1 to 11m, N connected to the pixel control line 41m.

Via the VSLs $42_1$ to $42_N$, the column-parallel AD conversion apparatus 22 is connected to each of the pixels 11m, 1 to 11m, N arranged in each row, and thus, an electric signal (voltage) (hereinafter, also referred to as a VSL signal) output from the pixel 11m, n onto the VSL 42n is supplied to the column-parallel AD conversion apparatus 22.

The column-parallel AD conversion apparatus 22 is a column-parallel AD conversion apparatus that performs AD conversion in parallel on the VSL signals supplied, via the VSLs $42_1$ to $42_N$, from each of the pixels 11m, 1 to 11m, N arranged in one row, and supplies digital data obtained as a result of the AD conversion to the output unit 23, as pixel values (pixel data) of the pixels 11m, 1 to 11m, N.

Here, the column-parallel AD conversion apparatus 22 can perform AD conversion in parallel on electric signals of all the N number of pixels 11m, 1 to 11m, N arranged in one row, and can also perform AD conversion in parallel on the electric signals of one or more pixels less than N among the N number of pixels 11m, 1 to 11m, N.

However, in the following, in order to simplify the description, it is assumed that the column-parallel AD conversion apparatus 22 performs AD conversion in parallel on the VSL signals of all the N number of pixels 11m, 1 to 11m, N arranged in one row.

The column-parallel AD conversion apparatus 22 includes an N number of analog to digital converters (ADCs) 311 to 31N in order to perform AD conversion in parallel on the VSL signals of all the N number of pixels 11m, 1 to 11m, N arranged in one row.

Moreover, the column-parallel AD conversion apparatus 22 further includes the reference signal output unit 33 and the clock output unit 34.

The reference signal output unit 33 includes, for example, a digital to analog converter (DAC), and, via a reference signal line 33A, supplies (outputs) the ADCs 311 to 31N with a reference signal, such as a ramp signal, having a period during which a level (voltage) changes from a predetermined initial value to a predetermined final value with a constant slope.

The clock output unit 34 supplies (outputs) a clock having a predetermined frequency to the ADCs 311 to 31N via a clock line 34A.

The ADC 31n is connected to a VSL 41n, and thus, the ADC 31n is supplied with the VSL signal (electric signal) output from the pixel 11m, n onto the VSL 41n.

The ADC 31n performs AD conversion of the VSL signal output from the pixel 11m, n by using the reference signal from the reference signal output unit 33 and the clock from the clock output unit 34, and further performs correlated double sampling (CDS) to obtain digital data as a pixel value.

Here, the ADC 31n compares the VSL signal of the pixel 11m, n with the reference signal from the reference signal output unit 33, and counts time required for changing a level of the reference signal until a level of the VSL signal of the pixel 11m, n matches with a level of the reference signal (until a magnitude relation between the VSL signal and the reference signal is reversed), thereby performing AD conversion on the VSL signal of the pixel 11m, n.

In the ADC 31n, the time required for the level of the reference signal to change until the level of the VSL signal of the pixel 11m, n matches the level of the reference signal is counted by counting the clock from the clock output unit 34.

Furthermore, to the N number of ADCs 311 to 31N, the VSL signals of the N number of pixels 11m, 1 to 11m, N in each of first to M-th rows of the pixel array 10 are sequentially supplied from, for example, the first row, and AD conversion and CDS on the VSL signals are performed row by row.

The output unit 23 selects a column n from which a pixel value is read, reads, from the ADC 31n of the column n, a result of AD conversion (and CDS) on the pixel 11m, n obtained by the ADC 31n as a pixel value, and outputs the pixel value to outside (in the present embodiment, the memory 3 (FIG. 1)).

Note that, here, although the ADC 31n is assumed to perform CDS in addition to AD conversion, the ADC 31n can perform only AD conversion, and the output unit 23 can perform CDS. Hereinafter, description of CDS will be omitted as appropriate.

<Configuration Example of Image Pickup Unit>

Figure 3:
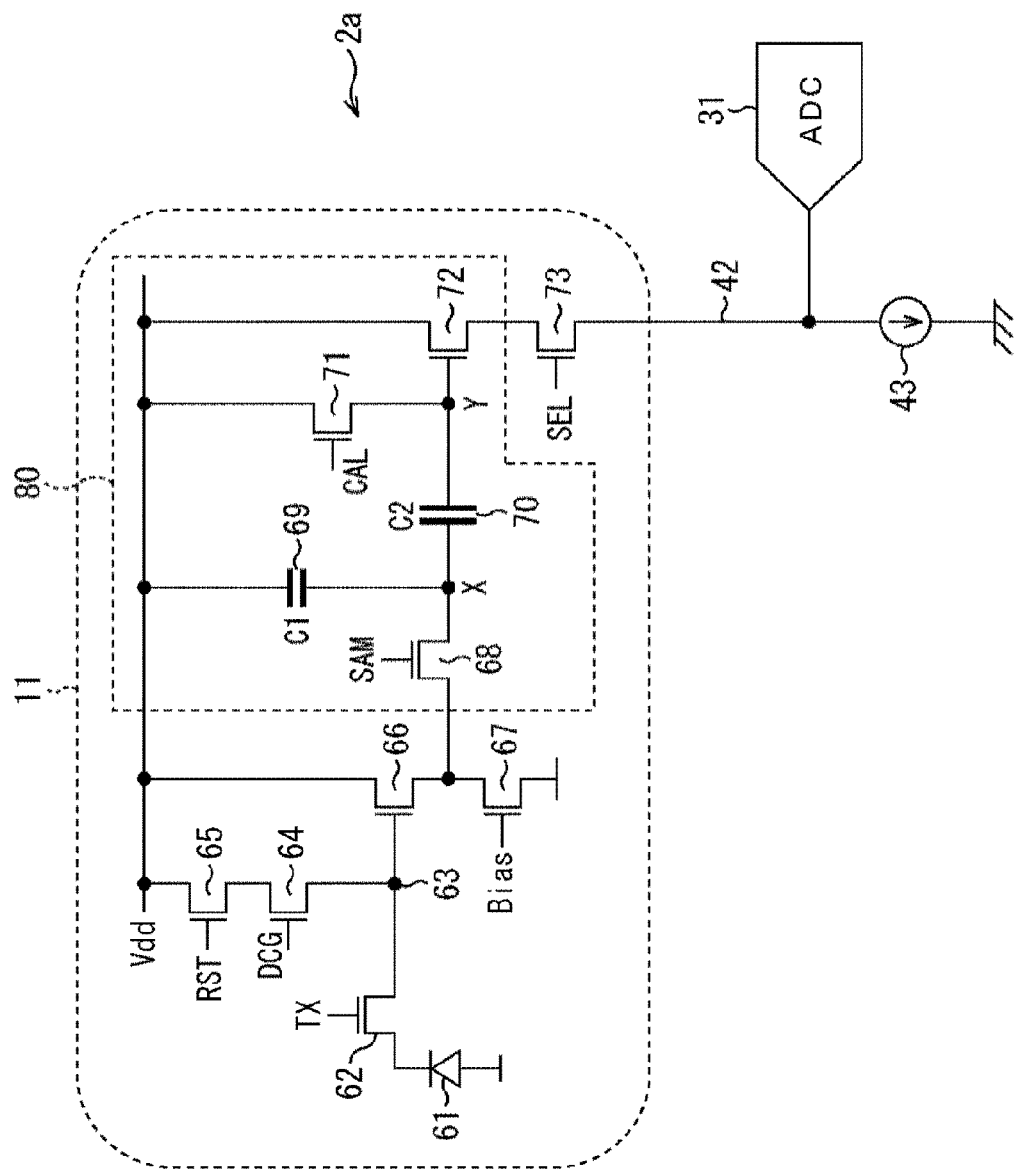
FIG. 3 is a circuit diagram of an image pickup unit according to a first embodiment.

FIG. 3 is a circuit diagram of the image pickup unit 2, and is a circuit diagram depicting a configuration example of the pixel 11m, n (hereinafter, referred to as a pixel 11) and a part of the column-parallel AD conversion apparatus 22 in FIG. 2. A configuration of the image pickup unit 2 depicted in FIG. 3 will be described as a configuration of an image pickup unit 2a in a first embodiment.

In FIG. 3, the pixel 11 of the pixel array 10 includes a photodiode (PD) 61, a transfer transistor 62, a floating diffusion (FD) 63, a conversion efficiency changeover switch 64, an FD reset transistor 65, an in-pixel amplification transistor 66, a constant current source 67, a sampling switch 68, a first capacitor 69, a second capacitor 70, an initialization switch 71, an output transistor 72, and a selection transistor 73.

The pixel 11 includes a memory unit 80 that temporarily stores a reset level and a signal level in order to implement a so-called global shutter that collectively resets and collectively exposes each pixel at the same timing. The memory unit 80 includes the sampling switch 68, the first capacitor 69, the second capacitor 70, the initialization switch 71, and the output transistor 72.

The PD 61 is, for example, a photoelectric conversion element including a PN-junction photodiode, receives light from a subject, generates a charge corresponding to an amount of received light with photoelectric conversion, and accumulates the charge.

The transfer transistor 62 is provided between the PD 61 and the FD 63, and transfers the charge accumulated in the PD 61 to the FD 63 according to a drive signal TX applied to a gate electrode of the transfer transistor 62.

In FIG. 3, the transfer transistor 62, the conversion efficiency changeover switch 64, the FD reset transistor 65, and the in-pixel amplification transistor 66 include N-channel MOS transistors.

Drive signals TX, DCG, and RST are supplied to gate electrodes of the transfer transistor 62 to the FD reset transistor 65. These drive signals are pulse signals for which a high-level state is an active state (on state) and a low-level state is an inactive state (off state).

Therefore, for example, in the transfer transistor 62, when the drive signal TX supplied to the gate electrode of the transfer transistor 62 enters the active state and the transfer transistor 62 enters the on state, the charge accumulated in the PD 61 is transferred to the FD 63.

The FD 63 is a floating diffusion region (FD) that converts the charge transferred from the PD 61 via the transfer transistor 62 into an electric signal, for example a voltage signal, and outputs the electric signal.

The FD 63 is connected to the FD reset transistor 65, and is also connected to the memory unit 80 via the in-pixel amplification transistor 66. A charge accumulation unit (not depicted), which is a capacitor (capacitor) for accumulating charge, is also connected to the FD 63 via the conversion efficiency changeover switch 64.

The conversion efficiency changeover switch 64 is turned on and off according to the drive signal DCG to switch a connection state between the FD 63 and the charge accumulation unit to either an electrically connected state or an electrically disconnected state.

That is, the drive signal DCG is supplied to the gate electrode that constitute the conversion efficiency changeover switch 64, and when the drive signal DCG is turned on, potential immediately below the conversion efficiency changeover switch 64 becomes deep, and the FD 63 and the charge accumulation unit are electrically connected.

In contrast, when the drive signal DCG is turned off, the potential immediately below the conversion efficiency changeover switch 64 becomes shallow, and the FD 63 and the charge accumulation unit are electrically disconnected. Therefore, by turning on and off the drive signal DCG, capacitance can be added to the FD 63, whereby sensitivity of a pixel can be changed.

The FD reset transistor 65 is an element that appropriately initializes (resets) each of regions from the FD 63 to the charge accumulation unit, and has a drain connected to a power supply of a power supply voltage Vdd and a source connected to the FD 63. To a gate electrode of the FD reset transistor 65, the drive signal RST is applied as a reset signal.

Furthermore, when the drive signal RST enters the active state, the FD reset transistor 65 enters a conductive state, and potential of the FD 63 or the like is reset to a level of the power supply voltage Vdd. That is, the FD 63 and the like are initialized.

The in-pixel amplification transistor 66 has a gate electrode connected to the FD 63 and a drain connected to the power supply of the power supply voltage Vdd, and serves as an input unit of a source-follower circuit that reads a charge obtained by the photoelectric conversion in the PD 61. That is, the in-pixel amplification transistor 66 constitutes the source-follower circuit by a source thereof being connected to the constant current source 67.

A wiring to which the in-pixel amplification transistor 66 and the constant current source 67 are connected is also connected to a wiring to which the sampling switch 68 in the memory unit 80 is connected. The sampling switch 68 can include an NMOS. A configuration is that a gate of the sampling switch 68 is supplied with a drive signal SAM, and when the drive signal SAM is set to the active state, a signal is supplied into the memory unit 80 via the in-pixel amplification transistor 66.

One end of the first capacitor 69 and one end of the second capacitor 70 are connected to a drain side of the sampling switch 68. A part to which the sampling switch 68, the first capacitor 69, and the second capacitor 70 are connected is referred to as an X node. Another end of the first capacitor 69 is connected to the power supply voltage Vdd. Another end of the second capacitor 70 is connected to a source of the initialization switch 71 and a gate of the output transistor 72. A part to which the second capacitor 70, the initialization switch 71, and the output transistor 72 are connected is referred to as a Y node.

A drain of the initialization switch 71 is connected to the power supply voltage Vdd. A drain of the output transistor 72 is also connected to the power supply voltage Vdd. A source of the output transistor 72 is connected to a drain of the selection transistor 73. The VSL 42 is connected to a source of the selection transistor 73.

A drive signal SEL is supplied to a gate of the selection transistor 73. When the drive signal SEL is set to the active state, the selection transistor 73 enters the conductive state, and signals accumulated in the memory unit 80 are output to the VLS 42.

<Operation of Image Pickup Unit>

Figure 4:
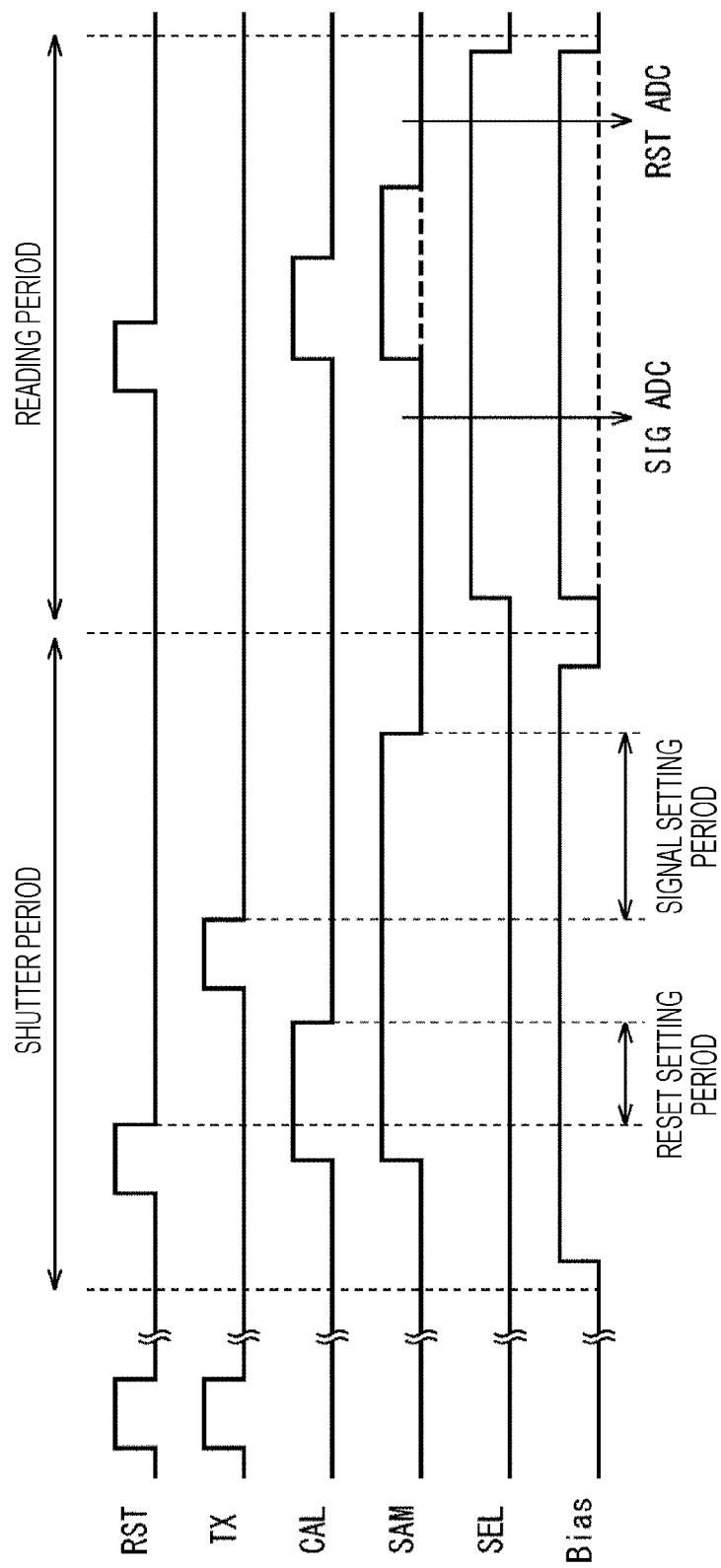
FIG. 4 is a diagram for describing operation of the image pickup unit.

Operation of the image pickup unit 2a depicted in FIG. 3 will be described with reference to FIG. 4.

During a shutter period, global shutter operation is performed. When the drive signal RST and the drive signal TX are set to the active state (referred to as Hi) and the charge of the PD 61 is reset, an exposure period starts. After the exposure period ends, a bias potential applied to the gate of the constant current source 67 is increased, and the in-pixel amplification transistor 66 is operated as a source-follower circuit.

When the drive signal RST is changed from the inactive state (referred to as Lo) to Hi, the FD reset transistor 65 is turned on, and the potential of the FD 63 is reset. At this time, a drive signal CAL and the drive signal SAM are also switched from Lo to Hi, and the sampling switch 68 and the initialization switch 71 are set to the on state. In such a state, the X node holds a level of a reset potential of the FD 63, and the Y node is initialized to the power supply voltage Vdd.

When the drive signal CAL is switched from Hi to LO, the Y node holds an initialization voltage, and the X node holds a level of an FD reset potential. This period is described as a reset setting period.

Because the drive signal SAM is maintained in the Hi state even after the reset setting period, the sampling switch 68 is maintained in the on state. In such a state, the drive signal TX is switched from Lo to Hi, whereby a signal charge from the PD 61 is transferred to the FD 63. Because the sampling switch 68 is in the on state, the signal charge transferred to the FD 63 is supplied to the X node via the in-pixel amplification transistor 66. Therefore, a potential corresponding to (FD reset level+signal charge) is written to the X node. This period is described as a signal setting period.

Because the second capacitor 70 is in a floating state in the signal setting period, when the voltage of the X node changes, voltage of the Y node also changes accordingly. Because the voltage of the X node changes from (FD reset potential) to (FD reset potential+potential corresponding to signal charge), the voltage of the Y node changes from (initialization potential) to (initialization voltage+potential corresponding to signal charge).

In this state, the drive signal SAM is switched from Hi to Lo, and the sampling switch 68 is set to the off state. When the sampling switch 68 enters the off state, a potential in the memory unit 80 is held. The operations so far are performed at the same timing in all the pixels 11 in the pixel array 10, thereby implementing a global shutter.

When a signal is held in the memory unit 80, reading of the signal held in the memory unit 80 starts in a reading period. When a row to be read is selected by the drive signal SEL being set to Hi, the selection transistor 73 enters the conductive state. When the selection transistor 73 enters the conductive state, the voltage of the Y node is output to the VSL 42 via the output transistor 72.

At this point, the voltage of the Y node is a voltage (signal) corresponding to (potential corresponding to FD reset level+signal charge). An ADC 31 executes AD conversion by using a signal in this state as a signal level.

When the AD conversion at the signal level is executed, the drive signal CAL is set to Hi for a predetermined period, and the initialization switch 71 is set to the on state for a predetermined period, whereby the Y node is set to the initialization voltage. An ADC 31 executes AD conversion by using a signal in this state as a reset level.

By calculating a difference between the signal level and reset level that are AD-converted by the ADC 31, it is possible to obtain a signal charge amount in which the initialization voltage is canceled.

<Effect of Leakage Current>

As described with reference to a timing chart in FIG. 4, the image pickup unit 2a depicted in FIG. 3 stores a signal in the memory unit 80 with global shutter operation, and thereafter, performs reading for each row. Because the reading is performed for each row, a row read first and a row read last have different reading timings.

If a leakage current is generated in the pixel 11, effects of the leakage current on the row read first and on the row read last are different, and the effect of the leakage current on the row read last may be greater. For example, there is a possibility that an amount of signals held in the first capacitor 69 or second capacitor 70 in the pixel 11 deviates from a correct value due to the leakage current.

Figure 5:
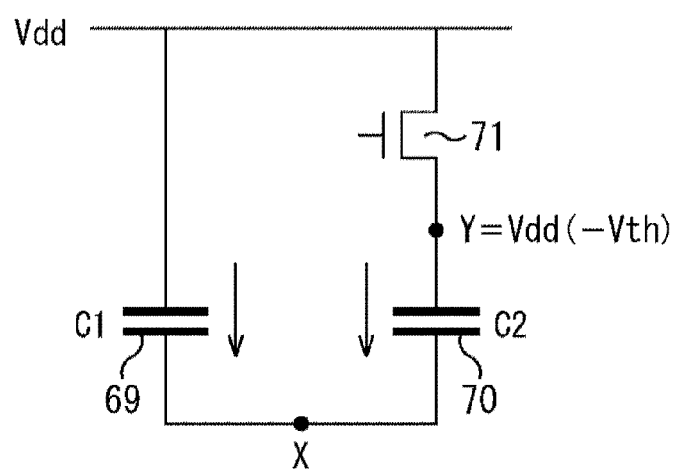
FIG. 5 is a diagram for describing an effect of leakage current.

Here, the leakage current in the first capacitor 69 and in the second capacitor 70 will be considered. FIG. 5 is a diagram for describing a relation of potential between the first capacitor 69 and the second capacitor 70.

The Y node is initialized by the power supply voltage Vdd, and the first capacitor 69 is in a state of being connected to the power supply voltage Vdd. To be precise, the Y node is initialized with a voltage (Vdd−Vth) obtained by subtracting a voltage Vth applied to the initialization switch 71, but here, the description will be continued assuming that the voltage Vth is a small value and has no effect.

Such a state is a state in which a leakage current flows from the Y node to the X node via the second capacitor 70 and a potential of the Y node drops. Meanwhile, because the first capacitor 69 is connected to the power supply voltage Vdd, a leakage current flows to the X node via the first capacitor 69, increasing a potential of the X node increases. Therefore, the potential drop of the Y node is reduced by a potential rise of the X node.

Thus, the first capacitor 69 has one end connected to the power supply voltage Vdd and another end connected to the X node, and the second capacitor 70 also has one end connected to the power supply voltage Vdd and another end connected to the X node, which is substantially the same as with the first capacitor 69, whereby an effect of the leakage current can be reduced. Therefore, it is possible to prevent a situation where an accurate value cannot be held due to the leakage current, and thus it is possible to improve image quality.

<Withstand Voltage and Improvement of Disposition Efficiency>

Figure 6:
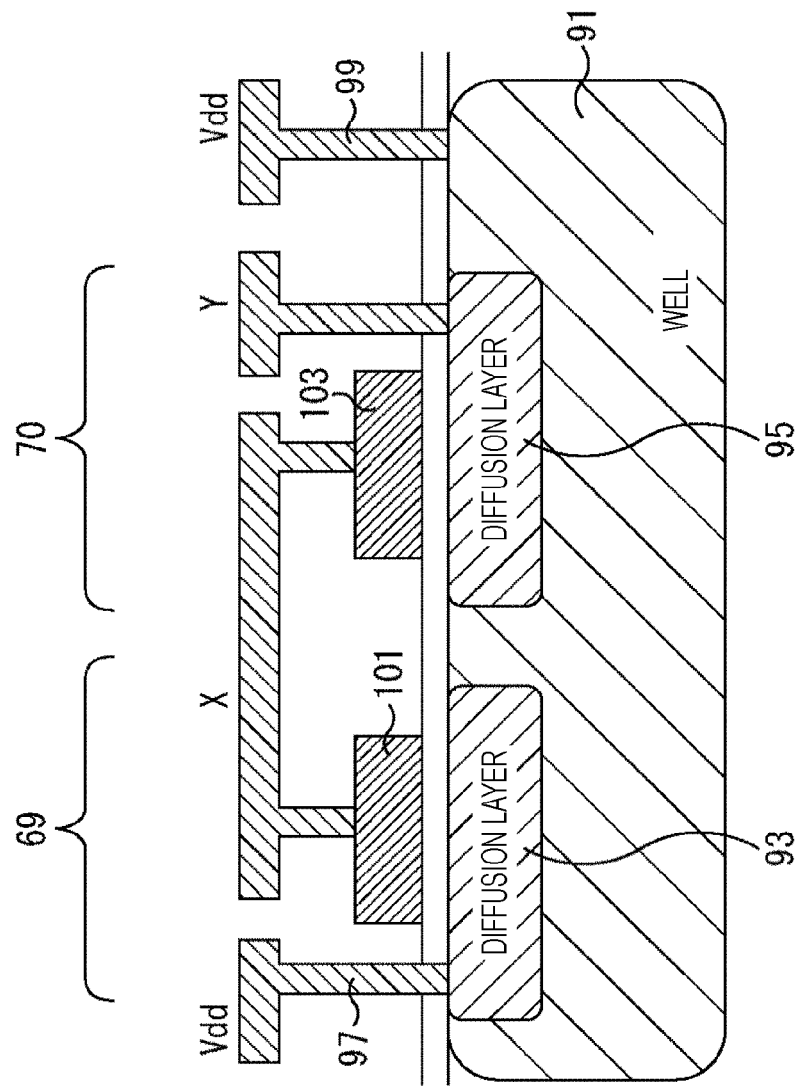
FIG. 6 is a diagram for describing disposition of capacitive elements.

With the image pickup unit 2a having a circuit configuration depicted in FIG. 3, it is also possible to obtain an effect that the withstand voltage of a capacitor can be relaxed. This will be described with reference to FIG. 6. FIG. 6 is a diagram depicting a cross-sectional configuration example of the first capacitor 69 and the second capacitor 70.

In a case where the first capacitor 69 and the second capacitor 70 are MOS capacitors and laid out, a configuration thereof will be depicted in FIG. 6. The MOS capacitor is formed by a capacitor including an oxide film sandwiched between a diffusion layer and a gate electrode. In the example depicted in FIG. 6, the first capacitor 69 includes a diffusion layer 93 formed in a well 91 and an oxide film 101, and the second capacitor 70 includes a diffusion layer 95 formed in the well 91 and an oxide film 103.

A wiring 97, which is connected to the power supply voltage Vdd, and the X node are connected to the diffusion layer 93. The X node and the Y node are connected to the diffusion layer 95. The Y node is connected to a wiring 99 connected to the power supply voltage Vdd via the initialization switch 71 that is not depicted in FIG. 6.

In an FD reset state, the X node has a value close to a voltage Vdd. When the transfer transistor 62 is turned on, the potential of the X node drops from the voltage Vdd by an amount of a signal charge. In the first capacitor 69 and the second capacitor 70, a difference of voltage applied to a capacitive element is smaller when a counter electrode has a potential close to the voltage Vdd. In FIG. 6, an electrode 97 and an electrode 99 are counter electrodes, and both the electrode 97 and the electrode 99 are electrodes to which the voltage Vdd is applied.

In a case of the configuration as depicted in FIG. 6, both the electrode 97 and the electrode 99, which are counter electrodes, are electrodes to which the voltage Vdd is applied, and thus a difference of voltage applied to the first capacitor 69 and voltage applied to the second capacitor 70 can be reduced. Therefore, a withstand voltage required for each of the first capacitor 69 and the second capacitor 70 can be kept low.

In a case where a potential of the well 91 is fixed to the same voltage Vdd as the power supply voltage Vdd, if the electrode 97 connected to the diffusion layer 93 is grounded, a large potential difference may be generated between the diffusion layer 93 and the well 91, and thus, a problem with a withstand voltage of a PN junction may occur, or an unnecessary parasitic capacitance may be generated on a PN connection.

In order to solve such a concern, for example, the diffusion layer 93 and the diffusion layer 95 are formed in separate wells 91, in other words, the well 91 including the diffusion layer 93 (referred to as a well 91-1) and the well 91 including the diffusion layer 95 (referred to as a well 91-2) are provided separately. In this case, it is necessary to form two wells, the well 91-1 and the well 91-2, and dispose the wells with a predetermined distance therebetween, and thus, there is a possibility that densification of the layout is hindered, and the miniaturization of the image pickup unit 2 is hindered.

In the present embodiment, as depicted in FIG. 6, the power supply voltage Vdd is connected to the diffusion layer 93, and the electrode 99 to which the power supply voltage Vdd is connected is disposed in vicinity of the diffusion layer 95. Therefore, even in a case where the potential of the well 91 is fixed to the voltage Vdd, there is no point at which a large potential difference is generated, and thus it is possible to solve a problem with a withstand voltage of the PN connection and to solve a concern that unnecessary parasitic capacitance is generated on the PN connection.

According to the present technology, leakage currents of the first capacitor 69 and second capacitor 70 can be canceled out, and fluctuation of a voltage level while the signal charge is held can be reduced. A withstand voltage limit of a capacitive element such as the first capacitor 69 and the second capacitor 70 can be relaxed. A layout efficiency of a capacitive element such as the first capacitor 69 and the second capacitor can be improved.

<Configuration and Operation of Image Pickup Unit in Second Embodiment>

Figure 7:
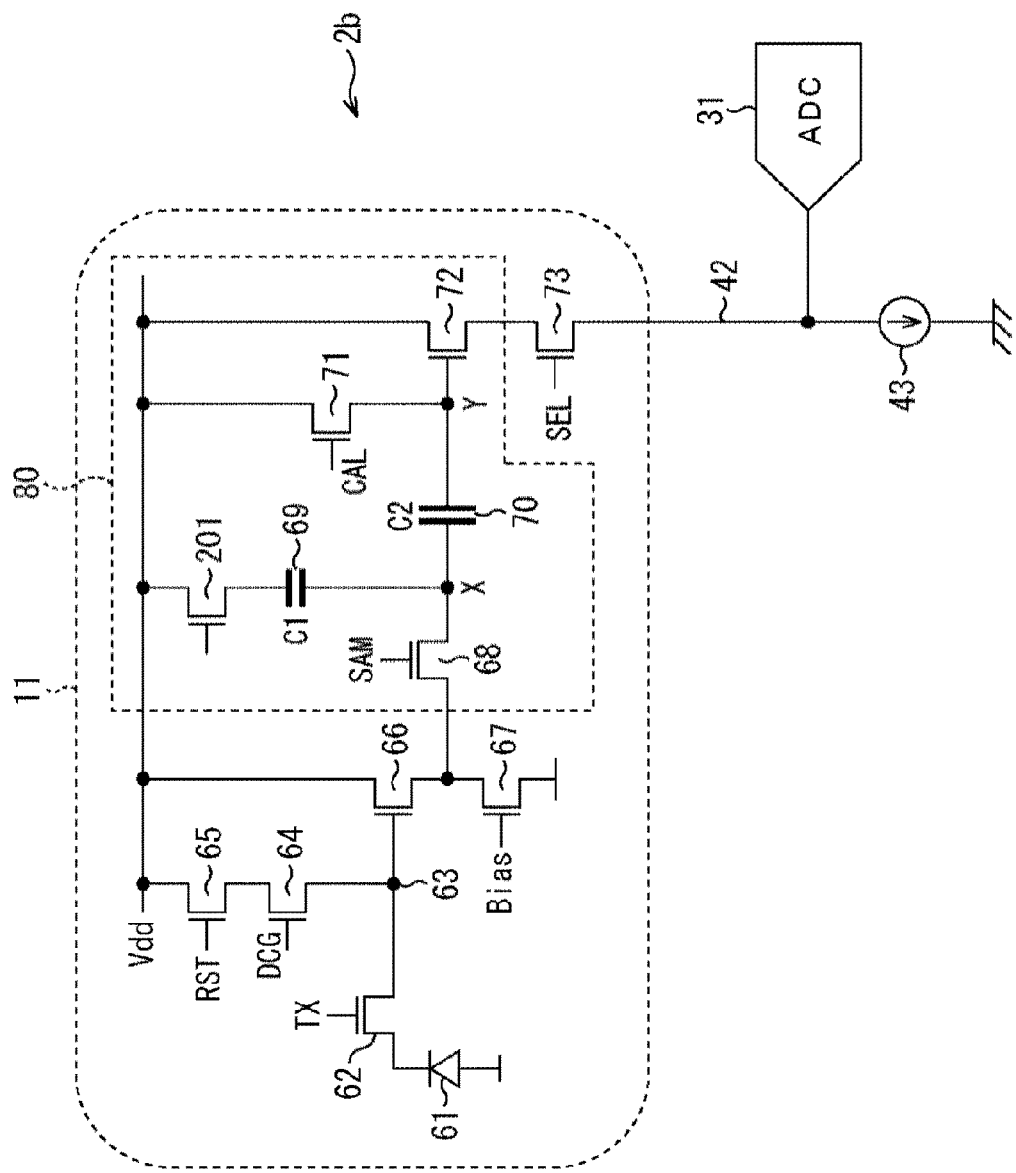
FIG. 7 is a circuit diagram of an image pickup unit according to a second embodiment.

FIG. 7 is a diagram depicting a configuration example of an image pickup unit 2b in a second embodiment. The image pickup unit 2b depicted in FIG. 7 is different from the image pickup unit 2a in the first embodiment depicted in FIG. 3 in that a dummy switch 201 is added, and other parts of the image pickup unit 2b have similar configurations.

The dummy switch 201 is provided between a first capacitor 69 and a wiring that supplies a power supply voltage Vdd. The dummy switch 201 is a switch having a characteristic equivalent to a characteristic of an initialization switch 71.

Figure 8:
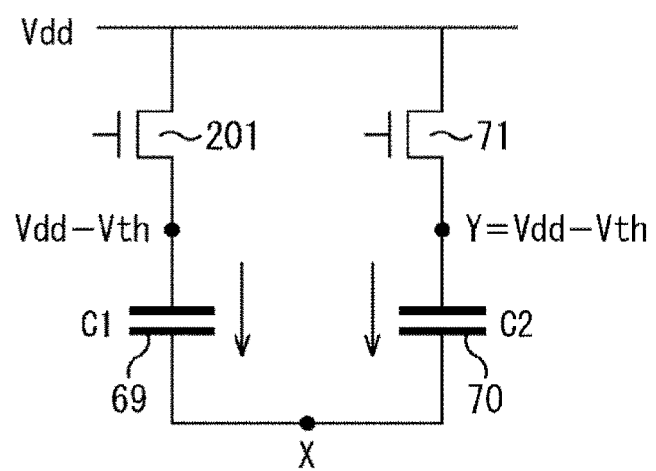
FIG. 8 is a diagram for describing an effect of leakage current.

With such a configuration, as described with reference to FIG. 8, an effect of leakage current can be further reduced. As in FIG. 5, FIG. 8 is a diagram for describing a relation of potential between the first capacitor 69 and a second capacitor 70.

Although initialized by the power supply voltage Vdd, a Y node is reset at a voltage (=voltage Vdd−voltage Vth) lower than the voltage Vdd because the voltage Vth is applied to a transistor of the initialization switch 71. Because there is an effect, such as charge injection or clock field through, when the initialization switch 71 transitions from an on state to an off state, an initialization potential of the Y node may be a value deviated from the power supply voltage Vdd.

In a case of the configuration described with reference to FIG. 5, the first capacitor 69 is also connected to the power supply voltage Vdd. Therefore, potential states of the first capacitor 69 and the second capacitor 70 are different from each other, leakage current also has a different value, and thus there is a possibility that a residual error occurs without being canceled out.

In contrast, in a case of the configuration described with reference to FIG. 8, it is possible to reduce chances of occurrence of a residual error by providing the dummy switch 201.

As depicted in FIG. 8, the potential of the first capacitor 69 is lowered by the voltage Vth of the dummy switch 201 (voltage Vdd−voltage Vth) by providing the dummy switch 201. Similarly, because the initialization switch 71 is provided, the potential of the second capacitor 70 is lowered by the voltage Vth of the initialization switch 71 (voltage Vdd−voltage Vth).

Thus, the potential states of the first capacitor 69 and the second capacitor 70 can be aligned more accurately. Therefore, it is possible to prevent occurrence of a residual error in cancellation of the leakage current.

Figure 9:
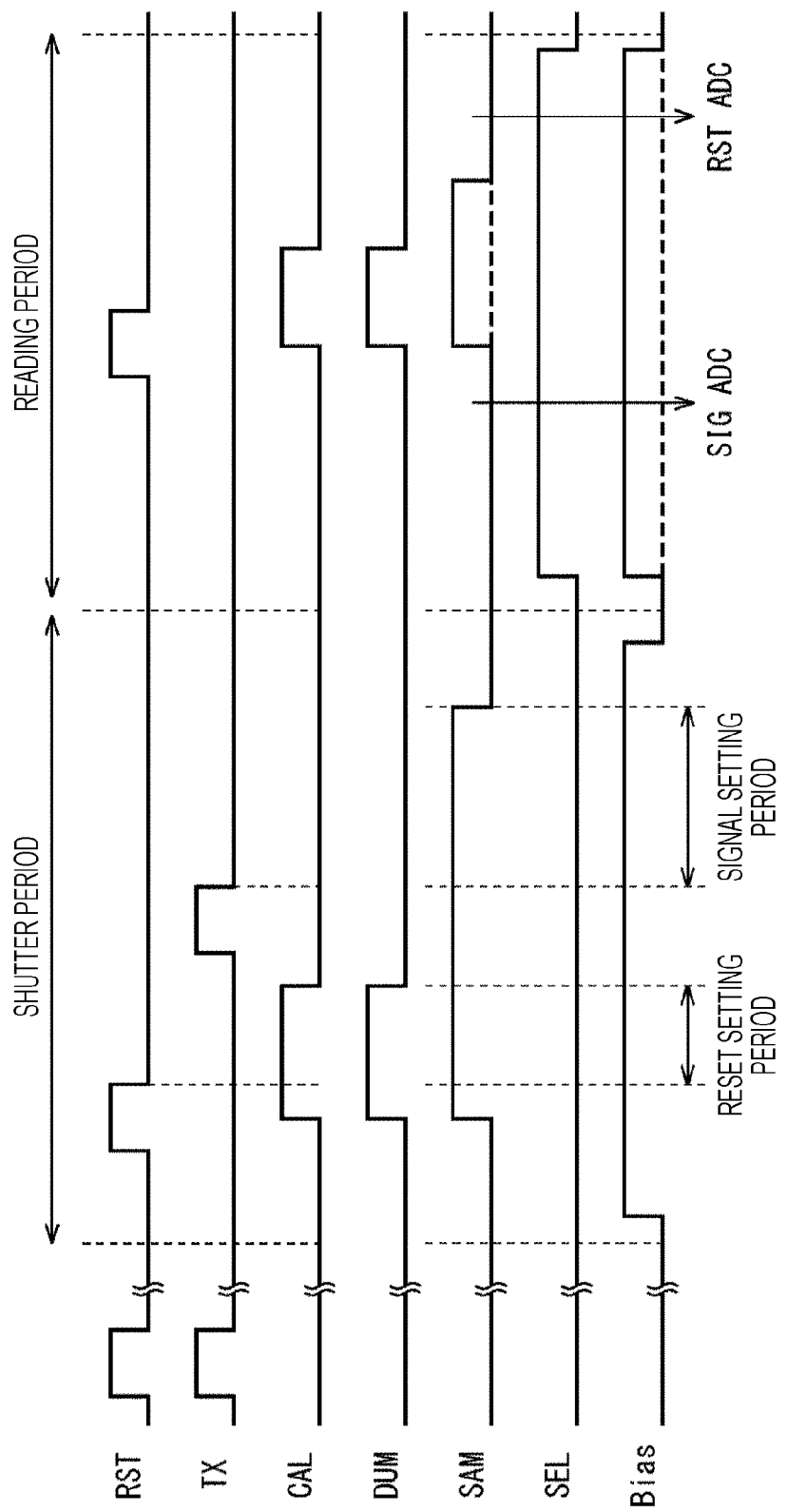
FIG. 9 is a diagram for describing operation of the image pickup unit.

Operation of the image pickup unit 2b provided with the dummy switch 201 will be described with reference to FIG. 9. A timing chart depicted in FIG. 9 is a timing chart in which operation of the dummy switch 201 is added to the timing chart depicted in FIG. 4. Because operation other than operation of the dummy switch 201 is similar to operation of the image pickup unit 2a in the first embodiment, description thereof will be omitted.

When a drive signal DUM is supplied to a gate of the dummy switch 201, and the drive signal DUM is set to Hi, the dummy switch 201 enters the conductive state. For both a shutter period and reading period, a drive signal CAL is set to Hi, and at the same time, the drive signal DUM is also set to Hi. Therefore, when the initialization switch 71 is turned on, the dummy switch 201 is also turned on.

When the drive signal CAL is switched from Hi to Lo, the drive signal DUM is also switched from Hi to Lo. Therefore, when the initialization switch 71 is turned off, the dummy switch 201 is also turned off. Thus, the dummy switch 201 is controlled to be turned on and off at the same timing as the initialization switch 71.

Thus, the first capacitor 69 has one end connected to the power supply voltage Vdd via the dummy switch 201 and another end connected to the X node, and the second capacitor 70, as with the first capacitor 69, has one end connected to the power supply voltage Vdd via the initialization switch 71 and another end connected to the X node, whereby an effect of the leakage current can be reduced. Therefore, it is possible to prevent a situation where an accurate value cannot be held due to the leakage current, and thus it is possible to improve image quality.

When a held voltage of the Y node hardly changes from an initial voltage, an effect of leakage current can be removed to a maximum. In other words, the effect of the leakage current can be removed to the maximum when a signal charge amount is small. A case where the signal charge amount is small is, for example, a case where an image of a dark scene is captured.

When an image of a dark scene is captured, it is necessary to reduce circuit noise in order to secure S/N. According to the present embodiment, when an image of such a dark scene is captured, an effect of leakage current can be removed to a maximum, and thus circuit noise can be reduced. Therefore, even in a case where an image of a dark scene is captured, shooting with improved image quality can be performed.

<Configuration and Operation of Image Pickup Unit in Third Embodiment>

Figure 10:
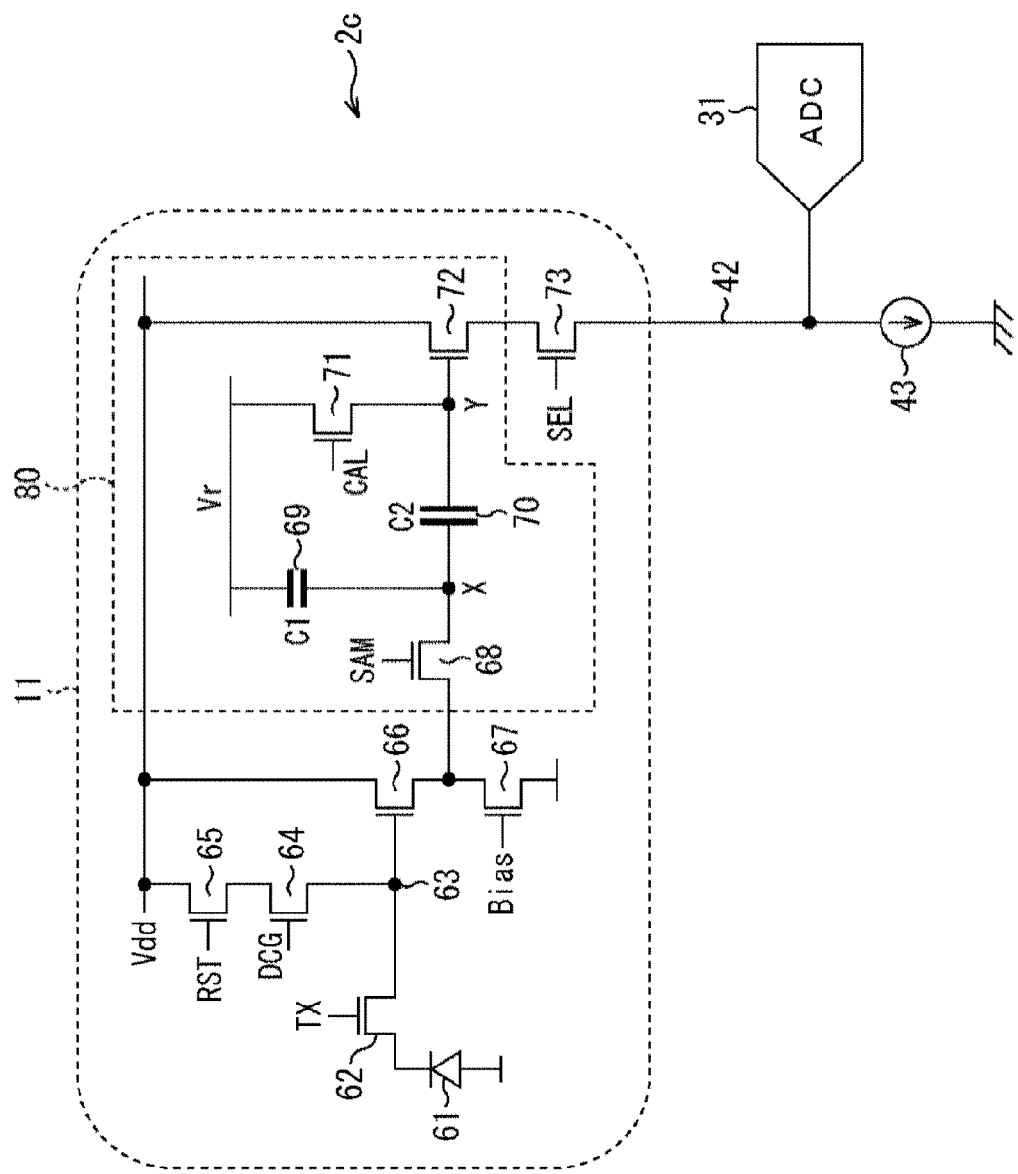
FIG. 10 is a circuit diagram of an image pickup unit according to a third embodiment.

FIG. 10 is a diagram depicting a configuration example of an image pickup unit 2c in a fourth embodiment. For the image pickup unit 2a (FIG. 3) in the first embodiment and the image pickup unit 2b (FIG. 7) in the second embodiment, there has been described exemplifying a configuration in which the first capacitor 69 and the second capacitor 70 are connected to the power supply voltage Vdd for supplying the voltage Vdd to reset the FD 63.

The image pickup unit 2c according to the third embodiment is different from the image pickup units 2a and 2b according to the first and second embodiments in that a first capacitor 69 and a second capacitor 70 are connected to a power supply voltage Vr for supplying a potential Vr, and other points are similar.

An effect of leakage current can be reduced by aligning potential states of the first capacitor 69 and the second capacitor 70. Therefore, as depicted in FIG. 10, the first capacitor 69 and the second capacitor 70 may be connected to a voltage source that supplies the potential Vr.

The first capacitor 69 has one end connected to an X node, and another end connected to the potential Vr. The second capacitor 70 has one end connected to an X node, and another end connected to the potential Vr via an initialization switch 71.

The potential Vr is used as a reset potential. In a configuration of the image pickup unit 2c depicted in FIG. 10, a power supply voltage Vdd that resets an F 63 and the power supply voltage Vr that resets the second capacitor are provided as different voltage sources. Thus, different voltage sources may be provided.

Thus, the first capacitor 69 and the second capacitor 70 may be connected to an independent power supply voltage Vr. The second embodiment may be applied to the third embodiment, and a dummy switch 201 may be provided between the first capacitor 69 and the power supply voltage Vr.

Operation of the image pickup unit 2c in the third embodiment is similar to operation of the image pickup unit 2a in the first embodiment. In a case where the dummy switch 201 is provided in the third embodiment, operation of the image pickup unit 2c is similar to operation of the image pickup unit 2c in the second embodiment.

In the image pickup unit 2c in the third embodiment also, leakage currents of the first capacitor 69 and second capacitor 70 can be canceled out, and fluctuation of a voltage level while the signal charge is held can be reduced. A withstand voltage limit of a capacitive element such as the first capacitor 69 and the second capacitor 70 can be relaxed. A layout efficiency of a capacitive element such as the first capacitor 69 and the second capacitor 70 can be improved.

<Example of Application to Endoscopic Surgery System>

The technology according to the present disclosure (the present technology) can be applied to various products. For example, the technology according to the present disclosure may be applied to an endoscopic surgery system.

Figure 11:
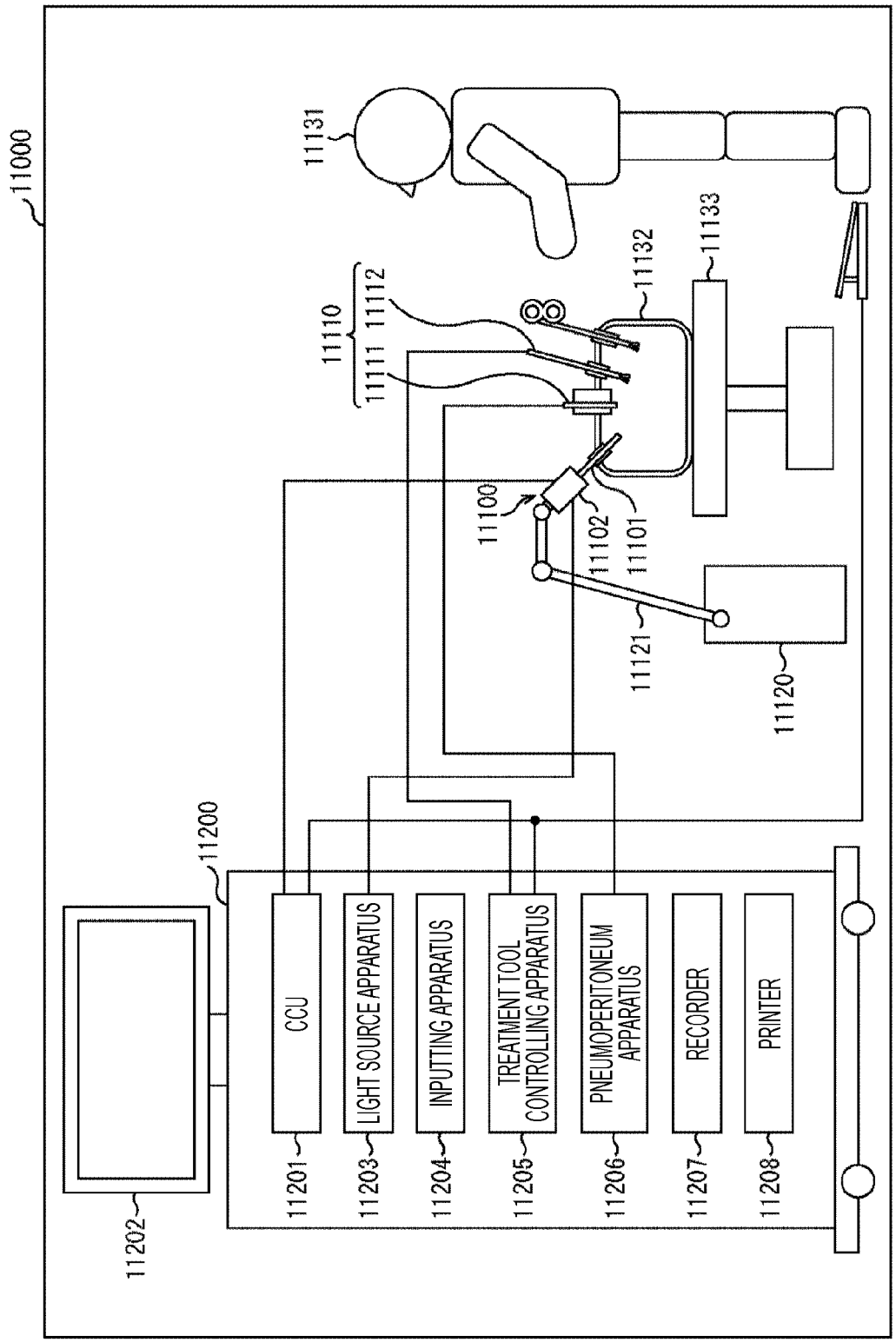
FIG. 11 is a diagram depicting an example of a schematic configuration of an endoscopic surgery system.

FIG. 11 is a view depicting an example of a schematic configuration of an endoscopic surgery system to which the technology according to an embodiment of the present disclosure (present technology) may be applied.

In FIG. 11, a state is depicted in which a surgeon (medical doctor) 11131 is using an endoscopic surgery system 11000 to perform surgery for a patient 11132 on a patient bed 11133. As depicted, the endoscopic surgery system 11000 includes an endoscope 11100, other surgical tools 11110 such as a pneumoperitoneum tube 11111 and an energy device 11112, a supporting arm apparatus 11120 which supports the endoscope 11100 thereon, and a cart 11200 on which various apparatus for endoscopic surgery are mounted.

The endoscope 11100 includes a lens barrel 11101 having a region of a predetermined length from a distal end thereof to be inserted into a body cavity of the patient 11132, and a camera head 11102 connected to a proximal end of the lens barrel 11101. In the example depicted, the endoscope 11100 is depicted which includes as a rigid endoscope having the lens barrel 11101 of the hard type. However, the endoscope 11100 may otherwise be included as a flexible endoscope having the lens barrel 11101 of the flexible type.

The lens barrel 11101 has, at a distal end thereof, an opening in which an objective lens is fitted. A light source apparatus 11203 is connected to the endoscope 11100 such that light generated by the light source apparatus 11203 is introduced to a distal end of the lens barrel 11101 by a light guide extending in the inside of the lens barrel 11101 and is irradiated toward an observation target in a body cavity of the patient 11132 through the objective lens. It is to be noted that the endoscope 11100 may be a forward-viewing endoscope or may be an oblique-viewing endoscope or a side-viewing endoscope.

An optical system and an image pickup element are provided in the inside of the camera head 11102 such that reflected light (observation light) from the observation target is condensed on the image pickup element by the optical system. The observation light is photo-electrically converted by the image pickup element to generate an electric signal corresponding to the observation light, namely, an image signal corresponding to an observation image. The image signal is transmitted as RAW data to a CCU 11201.

The CCU 11201 includes a central processing unit (CPU), a graphics processing unit (GPU) or the like and integrally controls operation of the endoscope 11100 and a display apparatus 11202. Further, the CCU 11201 receives an image signal from the camera head 11102 and performs, for the image signal, various image processes for displaying an image based on the image signal such as, for example, a development process (demosaic process).

The display apparatus 11202 displays thereon an image based on an image signal, for which the image processes have been performed by the CCU 11201, under the control of the CCU 11201.

The light source apparatus 11203 includes a light source such as, for example, a light emitting diode (LED) and supplies irradiation light upon imaging of a surgical region to the endoscope 11100.

An inputting apparatus 11204 is an input interface for the endoscopic surgery system 11000. A user can perform inputting of various kinds of information or instruction inputting to the endoscopic surgery system 11000 through the inputting apparatus 11204. For example, the user would input an instruction or a like to change an image pickup condition (type of irradiation light, magnification, focal distance or the like) by the endoscope 11100.

A treatment tool controlling apparatus 11205 controls driving of the energy device 11112 for cautery or incision of a tissue, sealing of a blood vessel or the like. A pneumoperitoneum apparatus 11206 feeds gas into a body cavity of the patient 11132 through the pneumoperitoneum tube 11111 to inflate the body cavity in order to secure the field of view of the endoscope 11100 and secure the working space for the surgeon. A recorder 11207 is an apparatus capable of recording various kinds of information relating to surgery. A printer 11208 is an apparatus capable of printing various kinds of information relating to surgery in various forms such as a text, an image or a graph.

It is to be noted that the light source apparatus 11203 which supplies irradiation light when a surgical region is to be imaged to the endoscope 11100 may include a white light source which includes, for example, an LED, a laser light source or a combination of them. Where a white light source includes a combination of red, green, and blue (RGB) laser light sources, since the output intensity and the output timing can be controlled with a high degree of accuracy for each color (each wavelength), adjustment of the white balance of a picked up image can be performed by the light source apparatus 11203. Further, in this case, if laser beams from the respective RGB laser light sources are irradiated time-divisionally on an observation target and driving of the image pickup elements of the camera head 11102 are controlled in synchronism with the irradiation timings. Then images individually corresponding to the R, G and B colors can be also picked up time-divisionally. According to this method, a color image can be obtained even if color filters are not provided for the image pickup element.

Further, the light source apparatus 11203 may be controlled such that the intensity of light to be outputted is changed for each predetermined time. By controlling driving of the image pickup element of the camera head 11102 in synchronism with the timing of the change of the intensity of light to acquire images time-divisionally and synthesizing the images, an image of a high dynamic range free from underexposed blocked up shadows and overexposed highlights can be created.

Further, the light source apparatus 11203 may be configured to supply light of a predetermined wavelength band ready for special light observation. In special light observation, for example, by utilizing the wavelength dependency of absorption of light in a body tissue to irradiate light of a narrow band in comparison with irradiation light upon ordinary observation (namely, white light), narrow band observation (narrow band imaging) of imaging a predetermined tissue such as a blood vessel of a superficial portion of the mucous membrane or the like in a high contrast is performed. Alternatively, in special light observation, fluorescent observation for obtaining an image from fluorescent light generated by irradiation of excitation light may be performed. In fluorescent observation, it is possible to perform observation of fluorescent light from a body tissue by irradiating excitation light on the body tissue (autofluorescence observation) or to obtain a fluorescent light image by locally injecting a reagent such as indocyanine green (ICG) into a body tissue and irradiating excitation light corresponding to a fluorescent light wavelength of the reagent upon the body tissue. The light source apparatus 11203 can be configured to supply such narrow-band light and/or excitation light suitable for special light observation as described above.

Figure 12:
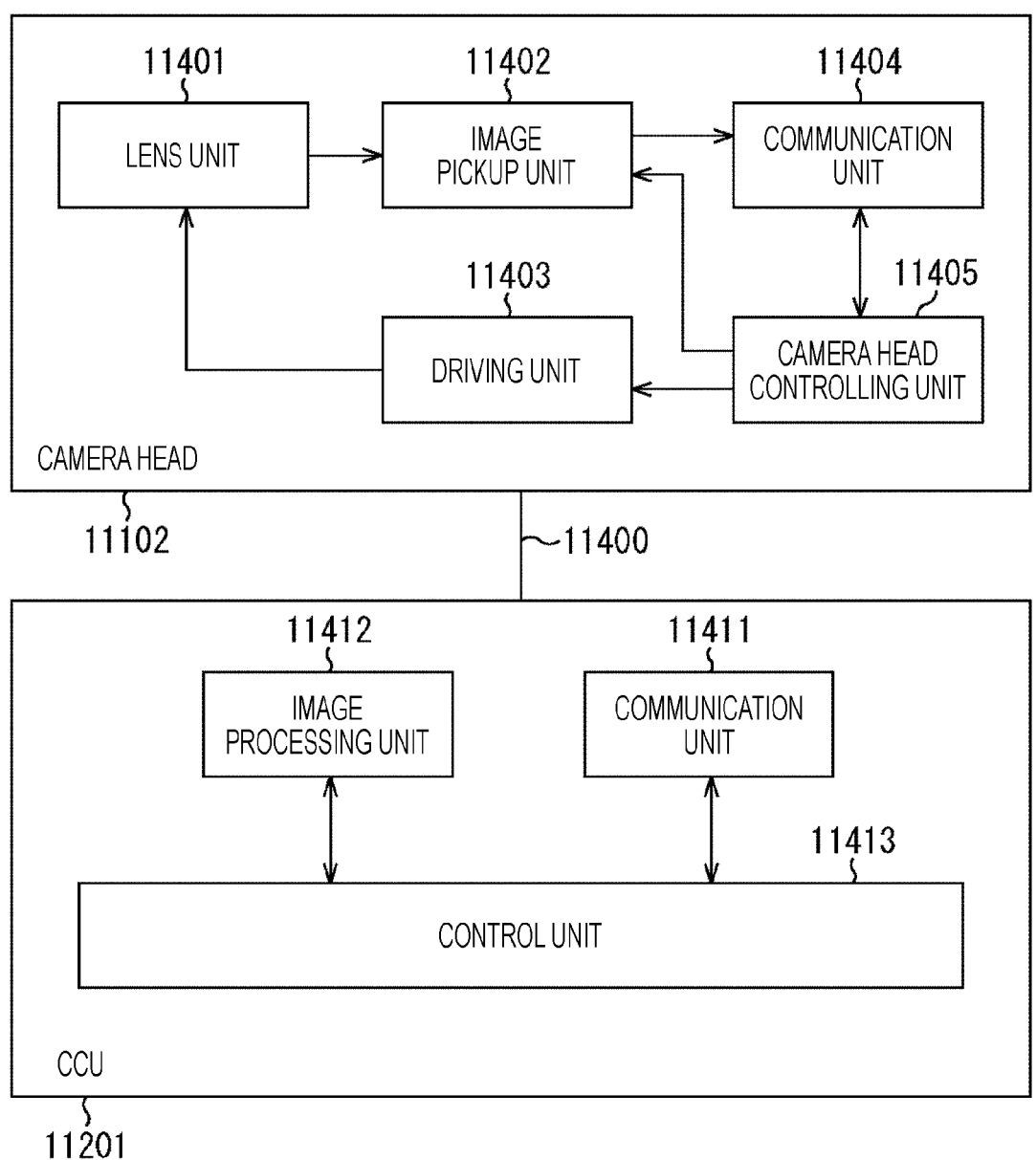
FIG. 12 is a block diagram depicting an example of a functional configuration of a camera head and a camera control unit (CCU).

FIG. 12 is a block diagram depicting an example of a functional configuration of the camera head 11102 and the CCU 11201 depicted in FIG. 11.

The camera head 11102 includes a lens unit 11401, an image pickup unit 11402, a driving unit 11403, a communication unit 11404 and a camera head controlling unit 11405. The CCU 11201 includes a communication unit 11411, an image processing unit 11412 and a control unit 11413. The camera head 11102 and the CCU 11201 are connected for communication to each other by a transmission cable 11400.

The lens unit 11401 is an optical system, provided at a connecting location to the lens barrel 11101. Observation light taken in from a distal end of the lens barrel 11101 is guided to the camera head 11102 and introduced into the lens unit 11401. The lens unit 11401 includes a combination of a plurality of lenses including a zoom lens and a focusing lens.

The number of image pickup elements which is included by the image pickup unit 11402 may be one (single-plate type) or a plural number (multi-plate type). Where the image pickup unit 11402 is configured as that of the multi-plate type, for example, image signals corresponding to respective R, G and B are generated by the image pickup elements, and the image signals may be synthesized to obtain a color image. The image pickup unit 11402 may also be configured so as to have a pair of image pickup elements for acquiring respective image signals for the right eye and the left eye ready for three dimensional (3D) display. If 3D display is performed, then the depth of a living body tissue in a surgical region can be comprehended more accurately by the surgeon 11131. It is to be noted that, where the image pickup unit 11402 is configured as that of stereoscopic type, a plurality of systems of lens units 11401 are provided corresponding to the individual image pickup elements.

Further, the image pickup unit 11402 may not necessarily be provided on the camera head 11102. For example, the image pickup unit 11402 may be provided immediately behind the objective lens in the inside of the lens barrel 11101.

The driving unit 11403 includes an actuator and moves the zoom lens and the focusing lens of the lens unit 11401 by a predetermined distance along an optical axis under the control of the camera head controlling unit 11405. Consequently, the magnification and the focal point of a picked up image by the image pickup unit 11402 can be adjusted suitably.

The communication unit 11404 includes a communication apparatus for transmitting and receiving various kinds of information to and from the CCU 11201. The communication unit 11404 transmits an image signal acquired from the image pickup unit 11402 as RAW data to the CCU 11201 through the transmission cable 11400.

In addition, the communication unit 11404 receives a control signal for controlling driving of the camera head 11102 from the CCU 11201 and supplies the control signal to the camera head controlling unit 11405. The control signal includes information relating to image pickup conditions such as, for example, information that a frame rate of a picked up image is designated, information that an exposure value upon image picking up is designated and/or information that a magnification and a focal point of a picked up image are designated.

It is to be noted that the image pickup conditions such as the frame rate, exposure value, magnification or focal point may be designated by the user or may be set automatically by the control unit 11413 of the CCU 11201 on the basis of an acquired image signal. In the latter case, an auto exposure (AE) function, an auto focus (AF) function and an auto white balance (AWB) function are incorporated in the endoscope 11100.

The camera head controlling unit 11405 controls driving of the camera head 11102 on the basis of a control signal from the CCU 11201 received through the communication unit 11404.

The communication unit 11411 includes a communication apparatus for transmitting and receiving various kinds of information to and from the camera head 11102. The communication unit 11411 receives an image signal transmitted thereto from the camera head 11102 through the transmission cable 11400.

Further, the communication unit 11411 transmits a control signal for controlling driving of the camera head 11102 to the camera head 11102. The image signal and the control signal can be transmitted by electrical communication, optical communication or the like.

The image processing unit 11412 performs various image processes for an image signal in the form of RAW data transmitted thereto from the camera head 11102.

The control unit 11413 performs various kinds of control relating to image picking up of a surgical region or the like by the endoscope 11100 and display of a picked up image obtained by image picking up of the surgical region or the like. For example, the control unit 11413 creates a control signal for controlling driving of the camera head 11102.

Further, the control unit 11413 controls, on the basis of an image signal for which image processes have been performed by the image processing unit 11412, the display apparatus 11202 to display a picked up image in which the surgical region or the like is imaged. Thereupon, the control unit 11413 may recognize various objects in the picked up image using various image recognition technologies. For example, the control unit 11413 can recognize a surgical tool such as forceps, a particular living body region, bleeding, mist when the energy device 11112 is used and so forth by detecting the shape, color and so forth of edges of objects included in a picked up image. The control unit 11413 may cause, when it controls the display apparatus 11202 to display a picked up image, various kinds of surgery supporting information to be displayed in an overlapping manner with an image of the surgical region using a result of the recognition. Where surgery supporting information is displayed in an overlapping manner and presented to the surgeon 11131, the burden on the surgeon 11131 can be reduced and the surgeon 11131 can proceed with the surgery with certainty.

The transmission cable 11400 which connects the camera head 11102 and the CCU 11201 to each other is an electric signal cable ready for communication of an electric signal, an optical fiber ready for optical communication or a composite cable ready for both of electrical and optical communications.

Here, while, in the example depicted, communication is performed by wired communication using the transmission cable 11400, the communication between the camera head 11102 and the CCU 11201 may be performed by wireless communication.

<Example of Application to Mobile Object>

The technology according to the present disclosure (the present technology) can be applied to various products. For example, the technology according to the present disclosure may be implemented as an apparatus mounted on a mobile object of any kind such as an automobile, an electric vehicle, a hybrid electric vehicle, a motorcycle, a bicycle, a personal mobility, an airplane, a drone, a ship, or a robot.

Figure 13:
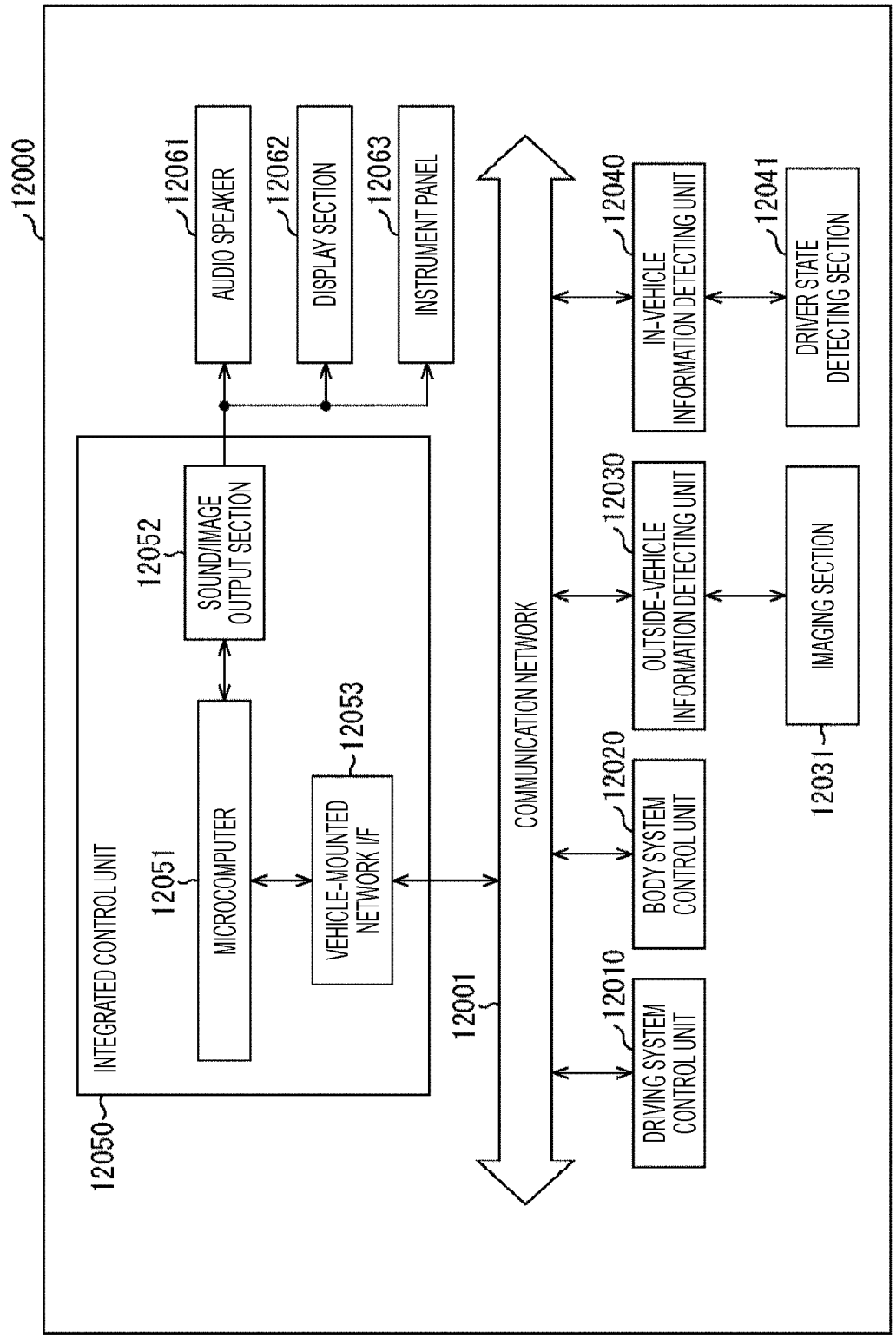
FIG. 13 is a block diagram depicting an example of schematic configuration of a vehicle control system.

FIG. 13 is a block diagram depicting an example of schematic configuration of a vehicle control system as an example of a mobile body control system to which the technology according to an embodiment of the present disclosure may be applied.

The vehicle control system 12000 includes a plurality of electronic control units connected to each other via a communication network 12001. In the example depicted in FIG. 13, the vehicle control system 12000 includes a driving system control unit 12010, a body system control unit 12020, an outside-vehicle information detecting unit 12030, an in-vehicle information detecting unit 12040, and an integrated control unit 12050. In addition, a microcomputer 12051, a sound/image output section 12052, and a vehicle-mounted network interface (I/F) 12053 are illustrated as a functional configuration of the integrated control unit 12050.

The driving system control unit 12010 controls the operation of devices related to the driving system of the vehicle in accordance with various kinds of programs. For example, the driving system control unit 12010 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like.

The body system control unit 12020 controls the operation of various kinds of devices provided to a vehicle body in accordance with various kinds of programs. For example, the body system control unit 12020 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 12020. The body system control unit 12020 receives these input radio waves or signals, and controls a door lock device, the power window device, the lamps, or the like of the vehicle.

The outside-vehicle information detecting unit 12030 detects information about the outside of the vehicle including the vehicle control system 12000. For example, the outside-vehicle information detecting unit 12030 is connected with an imaging section 12031. The outside-vehicle information detecting unit 12030 makes the imaging section 12031 image an image of the outside of the vehicle, and receives the imaged image. On the basis of the received image, the outside-vehicle information detecting unit 12030 may perform processing of detecting an object such as a human, a vehicle, an obstacle, a sign, a character on a road surface, or the like, or processing of detecting a distance thereto.

The imaging section 12031 is an optical sensor that receives light, and which outputs an electric signal corresponding to a received light amount of the light. The imaging section 12031 can output the electric signal as an image, or can output the electric signal as information about a measured distance. In addition, the light received by the imaging section 12031 may be visible light, or may be invisible light such as infrared rays or the like.

The in-vehicle information detecting unit 12040 detects information about the inside of the vehicle. The in-vehicle information detecting unit 12040 is, for example, connected with a driver state detecting section 12041 that detects the state of a driver. The driver state detecting section 12041, for example, includes a camera that images the driver. On the basis of detection information input from the driver state detecting section 12041, the in-vehicle information detecting unit 12040 may calculate a degree of fatigue of the driver or a degree of concentration of the driver, or may determine whether the driver is dozing.

The microcomputer 12051 can calculate a control target value for the driving force generating device, the steering mechanism, or the braking device on the basis of the information about the inside or outside of the vehicle which information is obtained by the outside-vehicle information detecting unit 12030 or the in-vehicle information detecting unit 12040, and output a control command to the driving system control unit 12010. For example, the microcomputer 12051 can perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like.

In addition, the microcomputer 12051 can perform cooperative control intended for automated driving, which makes the vehicle to travel automatedly without depending on the operation of the driver, or the like, by controlling the driving force generating device, the steering mechanism, the braking device, or the like on the basis of the information about the outside or inside of the vehicle which information is obtained by the outside-vehicle information detecting unit 12030 or the in-vehicle information detecting unit 12040.

In addition, the microcomputer 12051 can output a control command to the body system control unit 12020 on the basis of the information about the outside of the vehicle which information is obtained by the outside-vehicle information detecting unit 12030. For example, the microcomputer 12051 can perform cooperative control intended to prevent a glare by controlling the headlamp so as to change from a high beam to a low beam, for example, in accordance with the position of a preceding vehicle or an oncoming vehicle detected by the outside-vehicle information detecting unit 12030.

The sound/image output section 12052 transmits an output signal of at least one of a sound and an image to an output device capable of visually or auditorily notifying information to an occupant of the vehicle or the outside of the vehicle. In the example of FIG. 13, an audio speaker 12061, a display section 12062, and an instrument panel 12063 are illustrated as the output device. The display section 12062 may, for example, include at least one of an on-board display and a head-up display.

Figure 14:
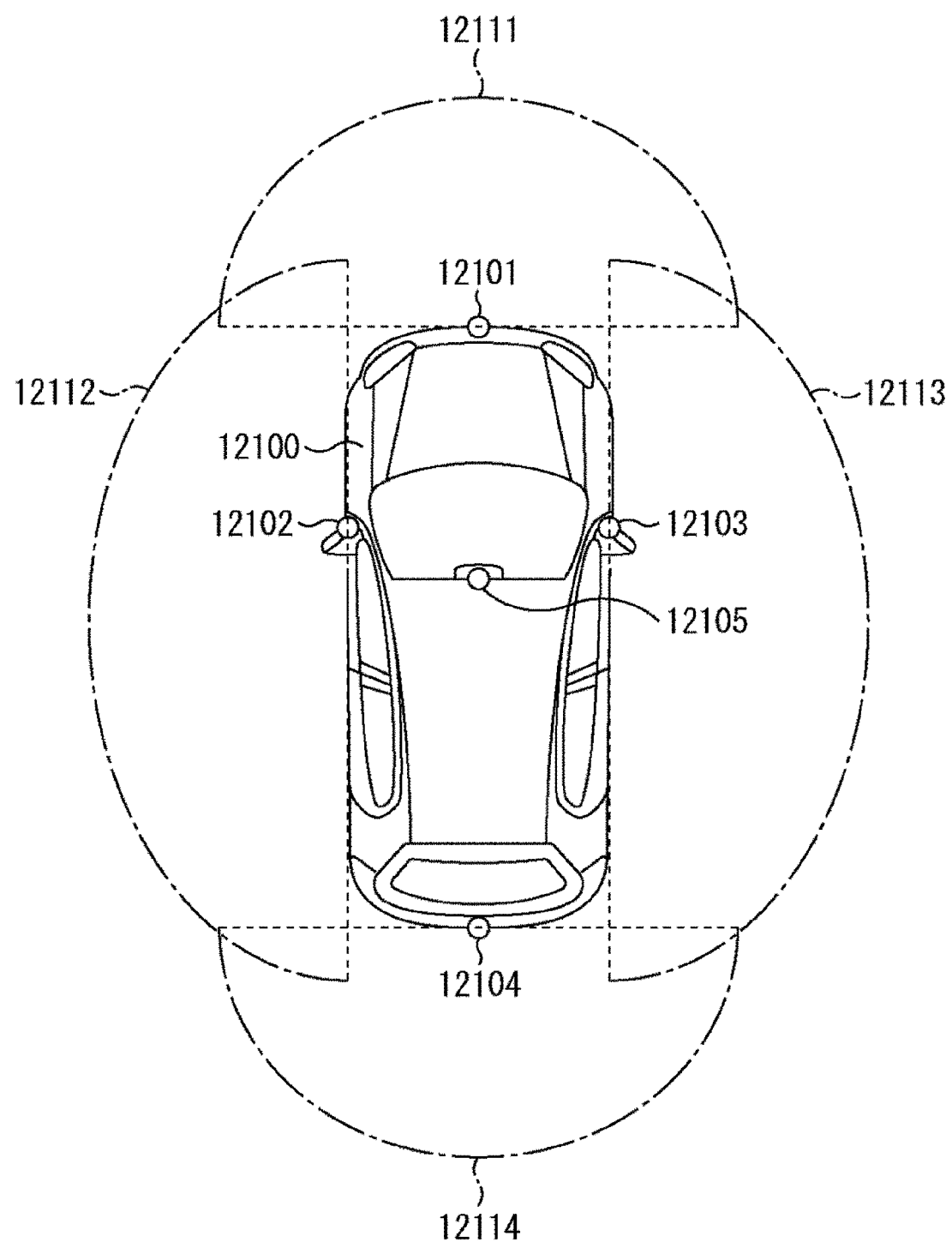
FIG. 14 is a diagram of assistance in explaining an example of installation positions of an outside-vehicle information detecting unit and an imaging section.

FIG. 14 is a diagram depicting an example of the installation position of the imaging section 12031.

In FIG. 14, the imaging section 12031 includes imaging sections 12101, 12102, 12103, 12104, and 12105.

The imaging sections 12101, 12102, 12103, 12104, and 12105 are, for example, disposed at positions on a front nose, sideview mirrors, a rear bumper, and a back door of the vehicle 12100 as well as a position on an upper portion of a windshield within the interior of the vehicle. The imaging section 12101 provided to the front nose and the imaging section 12105 provided to the upper portion of the windshield within the interior of the vehicle obtain mainly an image of the front of the vehicle 12100. The imaging sections 12102 and 12103 provided to the sideview mirrors obtain mainly an image of the sides of the vehicle 12100. The imaging section 12104 provided to the rear bumper or the back door obtains mainly an image of the rear of the vehicle 12100. The imaging section 12105 provided to the upper portion of the windshield within the interior of the vehicle is used mainly to detect a preceding vehicle, a pedestrian, an obstacle, a signal, a traffic sign, a lane, or the like.

Incidentally, FIG. 14 depicts an example of photographing ranges of the imaging sections 12101 to 12104. An imaging range 12111 represents the imaging range of the imaging section 12101 provided to the front nose. Imaging ranges 12112 and 12113 respectively represent the imaging ranges of the imaging sections 12102 and 12103 provided to the sideview mirrors. An imaging range 12114 represents the imaging range of the imaging section 12104 provided to the rear bumper or the back door. A bird's-eye image of the vehicle 12100 as viewed from above is obtained by superimposing image data imaged by the imaging sections 12101 to 12104, for example.

At least one of the imaging sections 12101 to 12104 may have a function of obtaining distance information. For example, at least one of the imaging sections 12101 to 12104 may be a stereo camera constituted of a plurality of imaging elements, or may be an imaging element having pixels for phase difference detection.

For example, the microcomputer 12051 can determine a distance to each three-dimensional object within the imaging ranges 12111 to 12114 and a temporal change in the distance (relative speed with respect to the vehicle 12100) on the basis of the distance information obtained from the imaging sections 12101 to 12104, and thereby extract, as a preceding vehicle, a nearest three-dimensional object in particular that is present on a traveling path of the vehicle 12100 and which travels in substantially the same direction as the vehicle 12100 at a predetermined speed (for example, equal to or more than 0 km/hour). Further, the microcomputer 12051 can set a following distance to be maintained in front of a preceding vehicle in advance, and perform automatic brake control (including following stop control), automatic acceleration control (including following start control), or the like. It is thus possible to perform cooperative control intended for automated driving that makes the vehicle travel automatedly without depending on the operation of the driver or the like.

For example, the microcomputer 12051 can classify three-dimensional object data on three-dimensional objects into three-dimensional object data of a two-wheeled vehicle, a standard-sized vehicle, a large-sized vehicle, a pedestrian, a utility pole, and other three-dimensional objects on the basis of the distance information obtained from the imaging sections 12101 to 12104, extract the classified three-dimensional object data, and use the extracted three-dimensional object data for automatic avoidance of an obstacle. For example, the microcomputer 12051 identifies obstacles around the vehicle 12100 as obstacles that the driver of the vehicle 12100 can recognize visually and obstacles that are difficult for the driver of the vehicle 12100 to recognize visually. Then, the microcomputer 12051 determines a collision risk indicating a risk of collision with each obstacle. In a situation in which the collision risk is equal to or higher than a set value and there is thus a possibility of collision, the microcomputer 12051 outputs a warning to the driver via the audio speaker 12061 or the display section 12062, and performs forced deceleration or avoidance steering via the driving system control unit 12010. The microcomputer 12051 can thereby assist in driving to avoid collision.

At least one of the imaging sections 12101 to 12104 may be an infrared camera that detects infrared rays. The microcomputer 12051 can, for example, recognize a pedestrian by determining whether or not there is a pedestrian in imaged images of the imaging sections 12101 to 12104. Such recognition of a pedestrian is, for example, performed by a procedure of extracting characteristic points in the imaged images of the imaging sections 12101 to 12104 as infrared cameras and a procedure of determining whether or not it is the pedestrian by performing pattern matching processing on a series of characteristic points representing the contour of the object. When the microcomputer 12051 determines that there is a pedestrian in the imaged images of the imaging sections 12101 to 12104, and thus recognizes the pedestrian, the sound/image output section 12052 controls the display section 12062 so that a square contour line for emphasis is displayed so as to be superimposed on the recognized pedestrian. The sound/image output section 12052 may also control the display section 12062 so that an icon or the like representing the pedestrian is displayed at a desired position.

In the present specification, a system represents an entire apparatus including a plurality of apparatuses.

Note that the effects described herein are only examples, and the effects of the present technology are not limited to these effects. Additional effects may also be obtained.

Note that embodiments of the present technology are not limited to the above-described embodiments, and various changes can be made without departing from the scope of the present technology.

Note that the present technology can have the following configurations.

(1)
An image pickup apparatus including
a photoelectric conversion unit that performs photoelectric conversion,
a first capacitor and a second capacitor that hold a signal from the photoelectric conversion unit, and
an initialization switch that initializes the second capacitor,
in which one end of the first capacitor, one end of the second capacitor, and an amplification unit that amplifies a signal from the photoelectric conversion unit are connected,
another end of the second capacitor and one end of the initialization switch are connected, and
another end of the first capacitor and another end of the initialization switch are connected to a voltage source.

(2)
The image pickup apparatus according to (1),
in which the voltage source includes a voltage source that supplies voltage that resets floating diffusion.

(3)
The image pickup apparatus according to (1),
in which the voltage source includes a voltage source different from a voltage source that supplies voltage that resets floating diffusion.

(4)
The image pickup apparatus according to any one of (1) to (3), further including
between the first capacitor and the voltage source, a dummy switch having a characteristic equivalent to a characteristic of the initialization switch.

(5)
The image pickup apparatus according to (4),
in which the initialization switch and the dummy switch are turned on and off at substantially the same timing.

(6)
The image pickup apparatus according to any one of (1) to (5), further including
a switch that is turned on when a signal from the photoelectric conversion unit is held in the first capacitor and the second capacitor,
in which the switch is connected to one end of the first capacitor and to one end of the second capacitor.

(7)
The image pickup apparatus according to any one of (1) to (6),
in which the first capacitor includes a first diffusion layer formed in a well and a first oxide film, the second capacitor includes a second diffusion layer formed in the well and a second oxide film, and the first diffusion layer and the second diffusion layer are formed in the same well.

REFERENCE SIGNS LIST

1 Optical system
2 Image pickup unit
3 Memory
4 Signal process unit
5 Output unit
6 Control unit
10 Pixel array
11 Pixel
20 Control unit
21 Pixel drive unit
22 Column-parallel AD conversion apparatus
23 Output unit
33 Reference signal output unit
34 Clock output unit
41 Pixel control line
43 Current source 62 Transfer transistor
64 Conversion efficiency changeover switch
65 FD reset transistor
66 In-pixel amplification transistor
67 Constant current source
68 Sampling switch
69 First capacitor
70 Second capacitor
71 Initialization switch
72 Output transistor
73 Selection transistor
80 Memory unit
91 Well
93 Diffusion layer
95 Diffusion layer
97 Electrode
99 Wiring
101 Oxide film
103 Oxide film
111 Pixel
201 Dummy switch

The invention claimed is:

1. An image pickup apparatus, comprising:
a photoelectric conversion unit configured to execute photoelectric conversion;
a first capacitor and a second capacitor configured to hold a signal from the photoelectric conversion unit;
an initialization switch configured to initialize the second capacitor, wherein
　a first end of the first capacitor is connected to an amplification unit configured to amplify the signal from the photoelectric conversion unit,
　a first end of the second capacitor is connected to the amplification unit,
　a second end of the second capacitor is connected to a first end of the initialization switch, and
　a second end of the first capacitor and a second end of the initialization switch are connected to a first voltage source; and
a dummy switch between the first capacitor and the first voltage source, wherein the dummy switch has a characteristic equivalent to a characteristic of the initialization switch.

2. The image pickup apparatus according to claim 1, wherein
the first voltage source includes a second voltage source, and
the second voltage source is configured to supply voltage that resets floating diffusion.

3. The image pickup apparatus according to claim 2, wherein the first voltage source includes a third voltage source different from the second voltage source.

4. The image pickup apparatus according to claim 1, wherein the initialization switch and the dummy switch are turned on and off at substantially a same timing.

5. The image pickup apparatus according to claim 1, further comprising:
a specific switch that is turned on in a case where the signal from the photoelectric conversion unit is held in the first capacitor and the second capacitor, wherein the specific switch is connected to the first end of the first capacitor and to the first end of the second capacitor.

6. The image pickup apparatus according to claim 1, wherein
the first capacitor includes a first diffusion layer and a first oxide film,
the second capacitor includes a second diffusion layer and a second oxide film, and
the first diffusion layer and the second diffusion layer are in a same well.

* * * * *